(12) United States Patent
Nies

(10) Patent No.: US 7,403,825 B2
(45) Date of Patent: Jul. 22, 2008

(54) PROGRAMMABLE DEVICE WITH REMOVABLE TEMPLATES

(76) Inventor: Juergen Nies, 612 Bellview Ave., Winchester, VA (US) 22501

( * ) Notice: Subject to any disclaimer, the term of this patent is extended or adjusted under 35 U.S.C. 154(b) by 176 days.

(21) Appl. No.: 11/398,005

(22) Filed: Apr. 5, 2006

(65) Prior Publication Data
US 2007/0239287 A1  Oct. 11, 2007

(51) Int. Cl.
| G05B 11/01 | (2006.01) |
|---|---|
| G05B 15/00 | (2006.01) |
| G06F 3/02 | (2006.01) |
| G06F 3/041 | (2006.01) |
| G09G 5/00 | (2006.01) |

(52) U.S. Cl. ........................... 700/17; 700/83; 345/171; 345/173

(58) Field of Classification Search ................. 345/171, 345/173; 700/17, 83
See application file for complete search history.

(56) References Cited

U.S. PATENT DOCUMENTS

| 3,158,317 | A | | 11/1964 | Alexander |
|---|---|---|---|---|
| 3,761,877 | A | | 9/1973 | Fernald |
| 3,943,335 | A | | 3/1976 | Kinker et al. |
| 4,280,809 | A | * | 7/1981 | Greenberg et al. ........... 434/343 |
| 4,439,757 | A | * | 3/1984 | Gross et al. .................... 341/23 |
| 4,475,806 | A | | 10/1984 | Daughton et al. |
| 4,699,501 | A | | 10/1987 | Watanabe et al. |
| 4,761,542 | A | | 8/1988 | Kubo et al. |
| 4,786,896 | A | | 11/1988 | Harte |
| 5,089,690 | A | * | 2/1992 | Okamura .................. 235/145 R |
| 5,178,542 | A | | 1/1993 | Chigrinsky et al. |
| 5,183,346 | A | * | 2/1993 | Tesar ........................... 400/490 |
| 5,189,288 | A | | 2/1993 | Anno et al. |
| 5,353,016 | A | * | 10/1994 | Kurita et al. ........... 340/825.22 |
| 5,450,078 | A | * | 9/1995 | Silva et al. ..................... 341/23 |
| 5,601,489 | A | * | 2/1997 | Komaki ......................... 463/44 |
| 5,870,110 | A | * | 2/1999 | Mallory ....................... 345/168 |
| 5,895,906 | A | * | 4/1999 | Danielson et al. ....... 235/462.45 |
| 5,946,635 | A | * | 8/1999 | Dominguez ................. 455/558 |
| 6,155,485 | A | | 12/2000 | Coughlin et al. |
| 6,814,294 | B2 | * | 11/2004 | Liston et al. ........... 235/472.01 |
| 2002/0002069 | A1 | * | 1/2002 | Keronen et al. ................. 463/1 |
| 2002/0066785 | A1 | * | 6/2002 | Liston et al. ................. 235/441 |
| 2002/0154154 | A1 | | 10/2002 | Cornelius |
| 2003/0066872 | A1 | | 4/2003 | McClure et al. |
| 2003/0177159 | A1 | | 9/2003 | Li et al. |
| 2003/0193481 | A1 | * | 10/2003 | Sokolsky ..................... 345/173 |
| 2004/0012629 | A1 | | 1/2004 | Walters |

(Continued)

FOREIGN PATENT DOCUMENTS

JP       2004127060 A       4/2004

OTHER PUBLICATIONS

Overlays for Alien Vs Predator; 2 pages; showing 3 overlays for Jaguar game console; 2 pages.*

(Continued)

*Primary Examiner*—Ronald D Hartman, Jr.
(74) *Attorney, Agent, or Firm*—Akerman Senterfitt

(57) ABSTRACT

Aspects of the invention relate to a programmable device with a template removably attached thereto. The template contains programming descriptors written in the preferred language of the consumer. As a result, the market for such programmable devices is not restricted based on the preferred language of the consumer.

12 Claims, 6 Drawing Sheets

U.S. PATENT DOCUMENTS

| | | |
|---|---|---|
| 2005/0058485 A1 | 3/2005 | Horii et al. |
| 2005/0171818 A1 | 8/2005 | McLaughlin |
| 2005/0186006 A1* | 8/2005 | Roberson .................... 400/492 |
| 2006/0074499 A1* | 4/2006 | Hamidpour .................. 700/19 |
| 2006/0256090 A1* | 11/2006 | Huppi ........................ 345/173 |

OTHER PUBLICATIONS

Alien vs Predator (Jaguar Game); Wikipedia; 10 pages.*
Controllers—Jaguar Controller; AtariAge; showing Jaguar controller (model # J8901); 3 pages.*
Intellivision; Wikipedia; 10 pages.*

* cited by examiner

PROGRAMMABLE DEVICE WITH REMOVABLE TEMPLATES

FIELD OF THE INVENTION

The invention relates in general to programmable devices and, more particularly, to user interaction with programmable devices.

BACKGROUND OF THE INVENTION

There are a number of programmable devices that include programming or other information on the device itself. Typically, such information is written only in a single language. For example, a thermostat sold in the United States may provide programming information written only in English. While such information may be understood by a majority of U.S. consumers, there are still many consumers who do not understand English, are not comfortable with English or otherwise prefer a different language. Many of these consumers may avoid such English-only programmable devices altogether, and, as a result, the available market for such devices becomes unnecessary limited. Further, even if such consumers decide to purchase the device, proper programming of the device may prove to be cumbersome, which can lead to consumer frustration with the product and negative impressions of the associated brand or manufacturer. Thus, there is a need for a programmable device that can minimize such concerns.

SUMMARY OF THE INVENTION

Aspects of the invention are directed to a programmable device. The programmable device has a display and a user input. In one embodiment, the programmable device can be a timer, such as a sprinkler timer. In another embodiment, the programmable device can be a thermostat. A programming parameter is presented on the display. The user input is substantially aligned with the programming parameter. The programming parameter can be a numeral. Alternatively, the programming parameter can be a symbol.

A template is removably attached to the programmable device. The programmable device can be removably attached to the programmable device in various ways. For example, the programmable device can include a pair of channels. A portion of the template can be received in each of the channels such that the template retainably engages the programming device. In one embodiment, the template can be removably attached to the programmable device by tape, an adhesive or a fastener.

The template has a first side and a second side. The first side of the template includes a programming descriptor. When the template is attached to the programmable device, the programming descriptor substantially aligns with the user input and/or the programming parameter. The programming descriptor is written in a first language. The second side of the template can include a programming descriptor written in a second language that is different from the first language.

Aspects of the invention are further directed to a method of improving user interaction with a programmable device. According to the method, a programmable device is provided. The programmable device can be a timer, such as a sprinkler timer. Alternatively, the programmable device can be a thermostat. The programmable device has a display and a user input. A programming parameter is presented on the display. The user input is substantially aligned with the programming parameter.

Two or more templates are provided with the programmable device. Each template has a first side and a second side. The first side of each template includes one or more programming descriptors. Each programming descriptor is written in a language that is different than the language used for the programming descriptor on the other templates.

In one embodiment, the templates can include one or more programming descriptors on the second side of each template. Each programming descriptor on the second side can be written in a different language from the other programming descriptors, including the language used on the first side of the same template.

According to the method, one of the templates is selected based on the language of the programming descriptor. The selected template is then attached to the programmable device such that the programming descriptor substantially aligns with the user input and/or the programming parameter.

In another respect, aspects of the invention are directed to a method of improving user interaction with a programmable device. According to the method, a programmable device is provided. The programmable device has a display and a user input. The programmable device can be a timer, such as a sprinkler timer. Alternatively, the programmable device can be a thermostat. A programming parameter is presented on the display. The user input substantially aligns with the programming parameter.

A single template is provided with the programmable device. The template has a first side and a second side. The first side of the template includes a first programming descriptor written in a first language. The second side of the template includes a second programming descriptor written in a second language. The first language is different from the second language.

Either the first language or the second language is selected. Next, the template is attached to the programmable device such that the programming descriptor in the selected one of the first and second languages faces outward and substantially aligns with the user input and/or the programming parameter.

Another method of improving user interaction with a programmable device according to aspects of the invention involves a consumer obtaining a programmable device having a display and a user input. A programming parameter is presented on the display. The user input is substantially aligned with the programming parameter. Instructions are provided with the programmable device, and the instructions provide contact information for a customer support center. Thus, a consumer can contact the customer support center to inform the customer support center of the consumer's preferred language. The contacting step can be performed over the telephone or over the internet.

With this information, a template is delivered to the consumer. The delivered template includes one or more programming descriptors written in the preferred language. The delivering step can be performed by providing an electronic image of the template. In such case, the method can further include the steps of: printing the electronic image of the template, and attaching the printed template to the programmable device such that the programming descriptor substantially aligns with the user input and/or the programming parameter.

DETAILED DESCRIPTION OF EMBODIMENTS OF THE INVENTION

Embodiments of the invention are directed to a programmable device that can accommodate consumers who are fluent in or otherwise prefer languages other than the prevalent language in the particular market. Aspects of the invention will be explained in connection with one possible system, but the detailed description is intended only as exemplary. Embodiments of the invention are shown in FIGS. 1-6, but the present invention is not limited to the illustrated structure or application.

Figure 1:
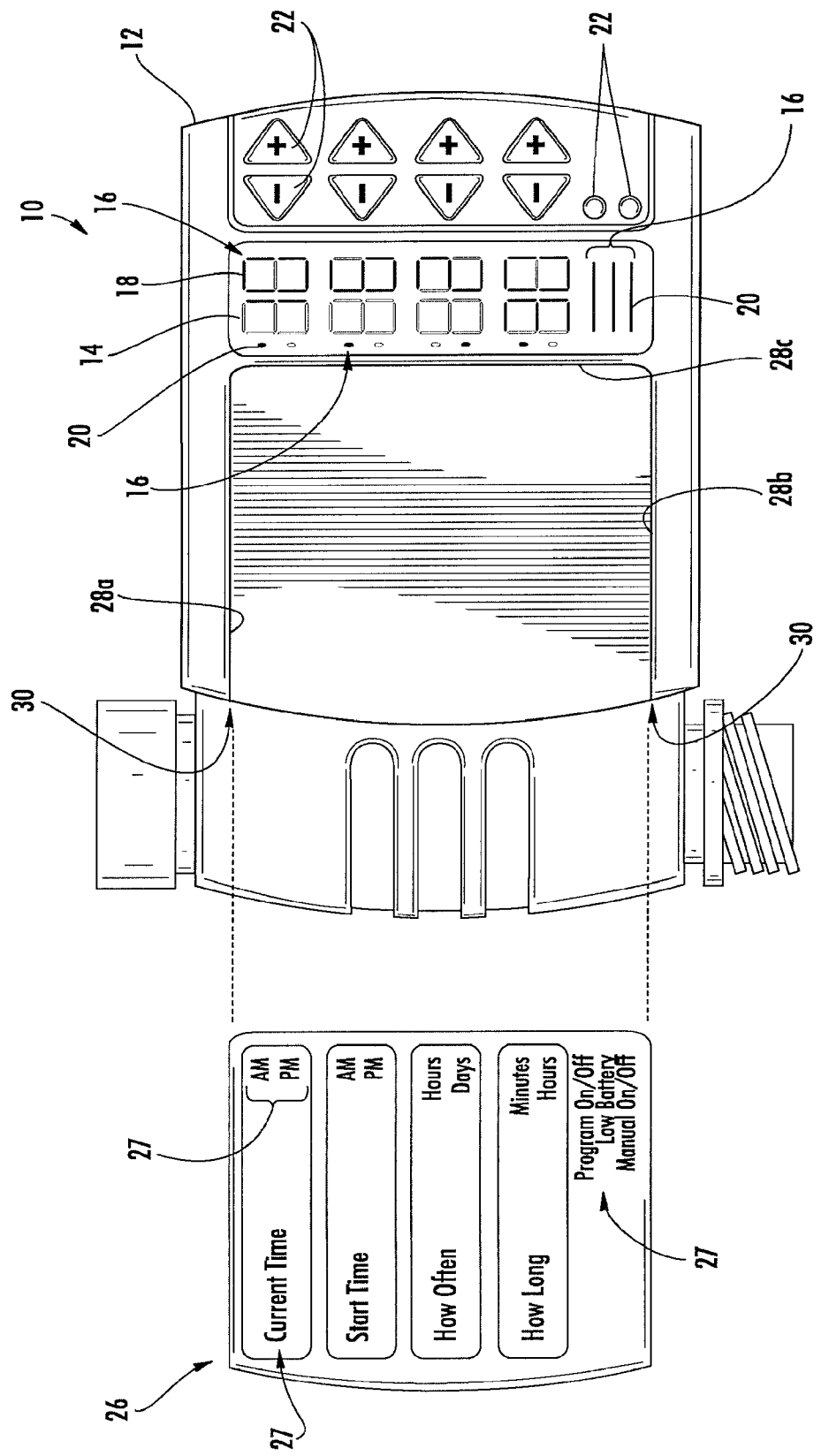
FIG. 1 is a side elevation view of a programmable device with a removable template containing programming descriptors in a first language according to aspects of the invention, showing the template detached from the programmable device.

Aspects of the invention can be used in connection with a programmable device 10. The programmable device 10 can be any suitable programmable device. For instance, the programmable device 10 can be a thermostat, a light timer, an alarm system, a timer for holiday lights and decorations, or a sprinkler timer 12 as shown in FIG. 1. The programmable device 10 can be electronic. While well suited for residential applications, aspects of the invention can be used in almost any setting where there are devices that require programming.

The programmable device 10 can have a display 14. The display 14 can be any of a variety of display devices such as a cathode ray tube (CRT), liquid crystal display (LCD), liquid crystal on silicon (LCOS) display or a plasma display. The display 14 can also be one or more light emitting diodes (LED) or other light sources. The display 14 can include multiple display devices, such as any combination of the above examples of display devices.

One or more programming parameters 16 can be presented on the display 14. Preferably, the programming parameter 16 is presented in a form such that it is not specific to a particular language or, at a minimum, so that it can be understood by consumers of multiple languages. For example, in one embodiment, the programming parameter 16 can be a numeral 18. The numeral 18 can be an Arabic numeral, a Chinese numeral, an Indic numeral, or a Roman numeral. The numeral 18 can represent any of a number of programming parameters. For instance, in the context of a sprinkler timer 12, a numeral 18 can represent such parameters as current time, sprinkler start time, sprinkler duration and/or frequency.

Alternatively or in addition, the programming parameter 16 can be a symbol 20, such as a circle, dot, line, or any other geometric shape. The symbol 20 can be used to convey a programming parameter or the status thereof. In one embodiment, the appearance or non-appearance of the symbol 20 can indicate the status of a programming parameter. For example, the appearance or non-appearance of the symbol 20 can be used to indicate whether the time is AM or PM, whether the program is on or off, whether the device is set for manual override or whether the battery is low.

Figure 2:
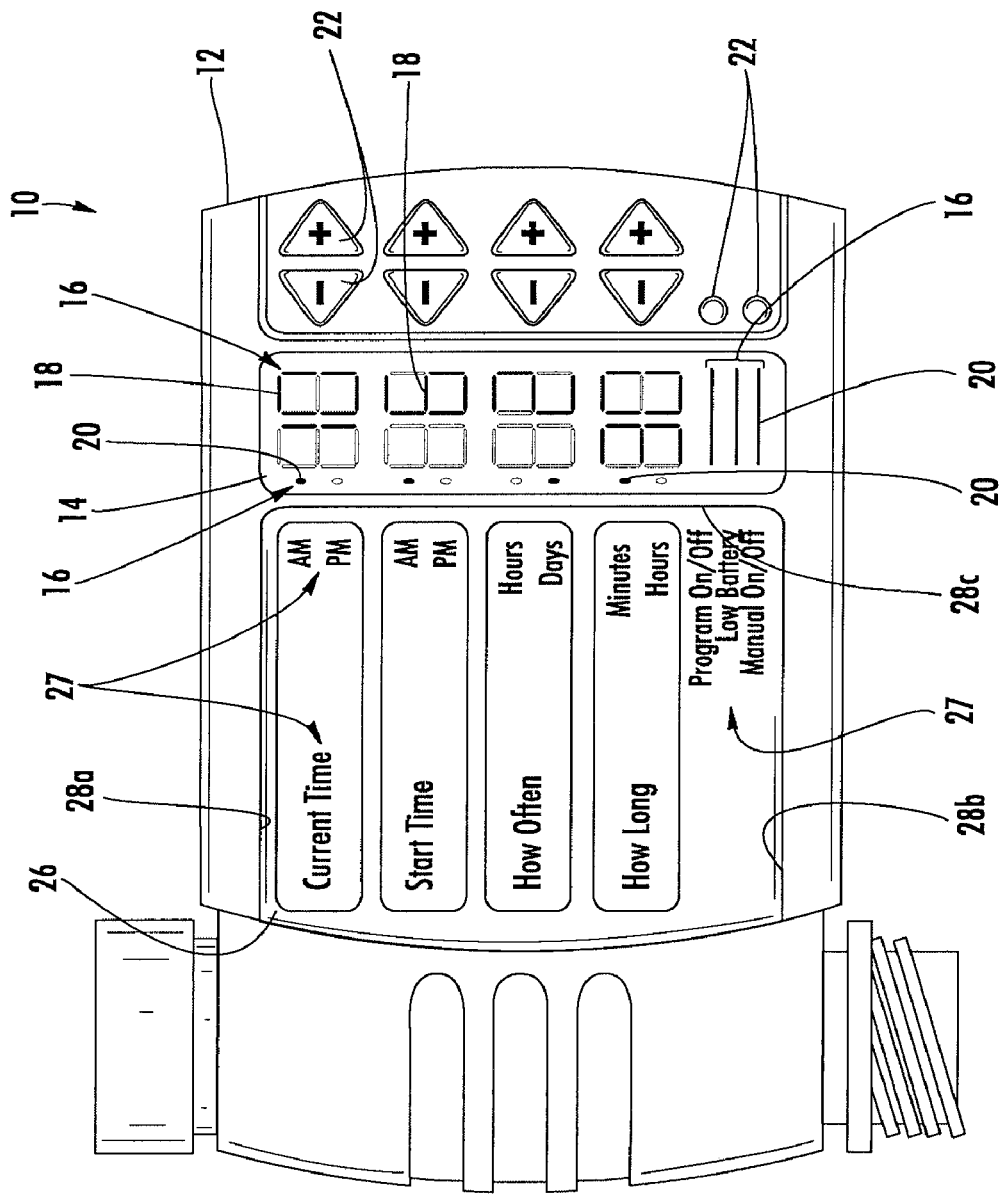
FIG. 2 is a side elevation view of the programmable device of FIG. 1, showing the template attached to the programmable device.

The programmable device 10 can include a user input 22 operatively connected thereto. The user input 22 can allow a user to modify the programming parameter 16 presented on the display 14. In one embodiment, the user input 22 can be a button, knob, switch, dial or any other similar structure. In one embodiment, the user input 22 can be a touch screen, which can be a part of the display 14. Ideally, the user input 22 is substantially aligned with or otherwise associated with a programming parameter 16 on the display 14 such that the user understands that a particular user input 22 is associated with a particular programming parameter 16. For instance, the user input 22 and the programming parameter 16 can be substantially horizontally aligned, as shown in FIG. 2. Alternatively, the user input 22 and the programming parameter 16 can be substantially vertically aligned. Further association of the user input 22 and the related programming parameter 16 can be achieved by lines, grooves or other markings 24 provided on the programming device 10 and/or the display 14.

According to aspects of the invention, a template 26 can be removably attached to the programmable device 10. The template 26 can be made of any suitable material. In the case of outdoor applications or in other applications where moisture and/or ultraviolet light are concerns, the template 26 can be made of plastic. For indoor applications or applications, the template 26 can be made of plastic, metal or paper. The template 26 can include one or more programming descriptors 27. The programming descriptor 27 can be included on the template 26 using any suitable process, including, for example, etching, carving, printing, painting, silk screening, drawing and/or engraving.

The template 26 can be removably attached to the programmable device 10. "Removably attached" is intended to mean attached in such a way that a consumer can readily separate the template from the programmable device with little or no damage to the template 26 and/or the programmable device 10. Removable attachment can be achieved in any suitable manner. For example, the template 26 can be attached to the programmable device 10 by tape, adhesive, screws, and/or any other fastener.

In addition, the programmable device 10 can include one or more features that can retain the template 26. In one embodiment, the programmable device 10 can include a pair of channels 28a, 28b, as shown in FIG. 1. The channels 28a, 28b can extend substantially parallel to each other along the programmable device 10. At one end, the pair of channels 28a, 28b can transition into a transverse channel 28c. At the opposite end, the pair of channels 28a, 28b can terminate to provide an access openings 30 into the channels 28a, 28b. As a result, a portion of the template 26 can be inserted into the access openings 30 and slid along the channels 28a, 28b and such that one end of the template 26 is received in or otherwise engages with the transverse channel 28c. Again, the provision of the channels 28a, 28b, 28c is just one way that the programming device 10 can be adapted to retainably engage the template 26. When the template 26 is attached to the programmable device 10, each programming descriptor 27 on the template 26 can substantially align with a respective one of the programming parameters 16 and/or user inputs 22 such that it is clear to a user that a particular programming descriptor 27 is associated with a particular programming parameter 16 and/or user input 22 (see FIG. 5).

Figure 4B:
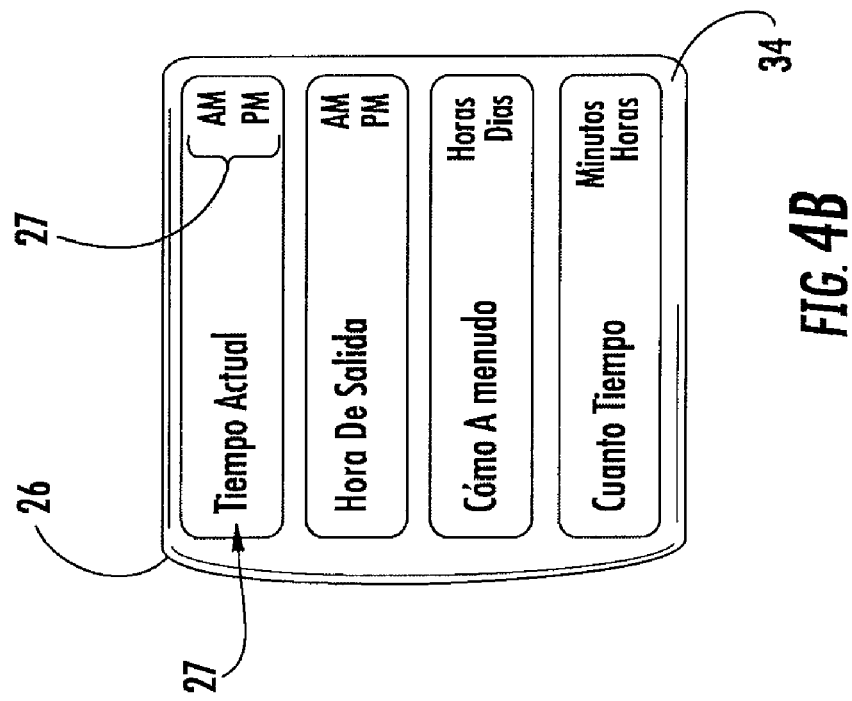
FIG. 4B is a side elevation view of a template according to aspects of the invention, showing a second side of the template shown in FIG. 4A, wherein the programming descriptors are written in a second language that is different from the first language.
Figure 4A:
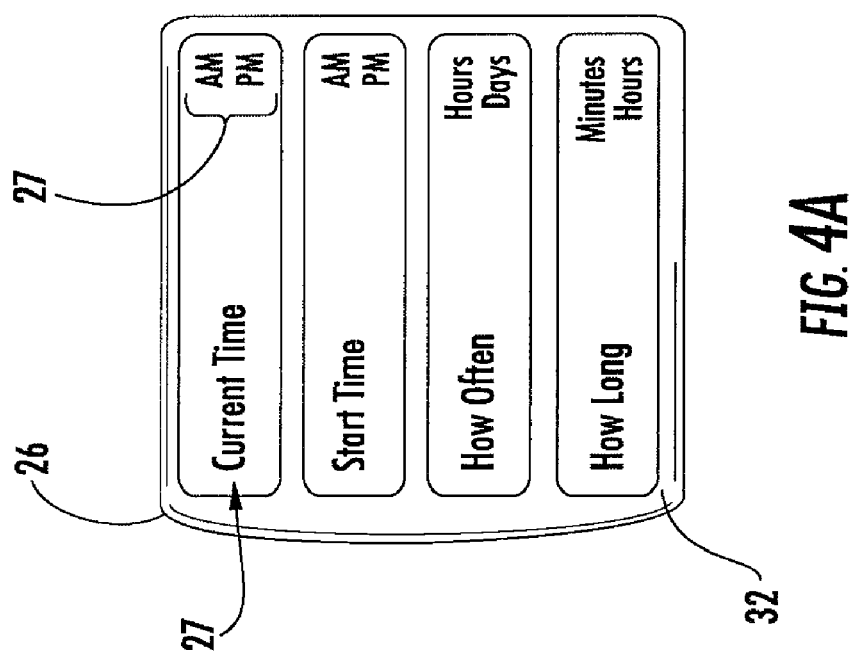
FIG. 4A is a side elevation view of a template according to aspects of the invention, showing a first side of the template with programming descriptors written in a first language.
Figure 5:
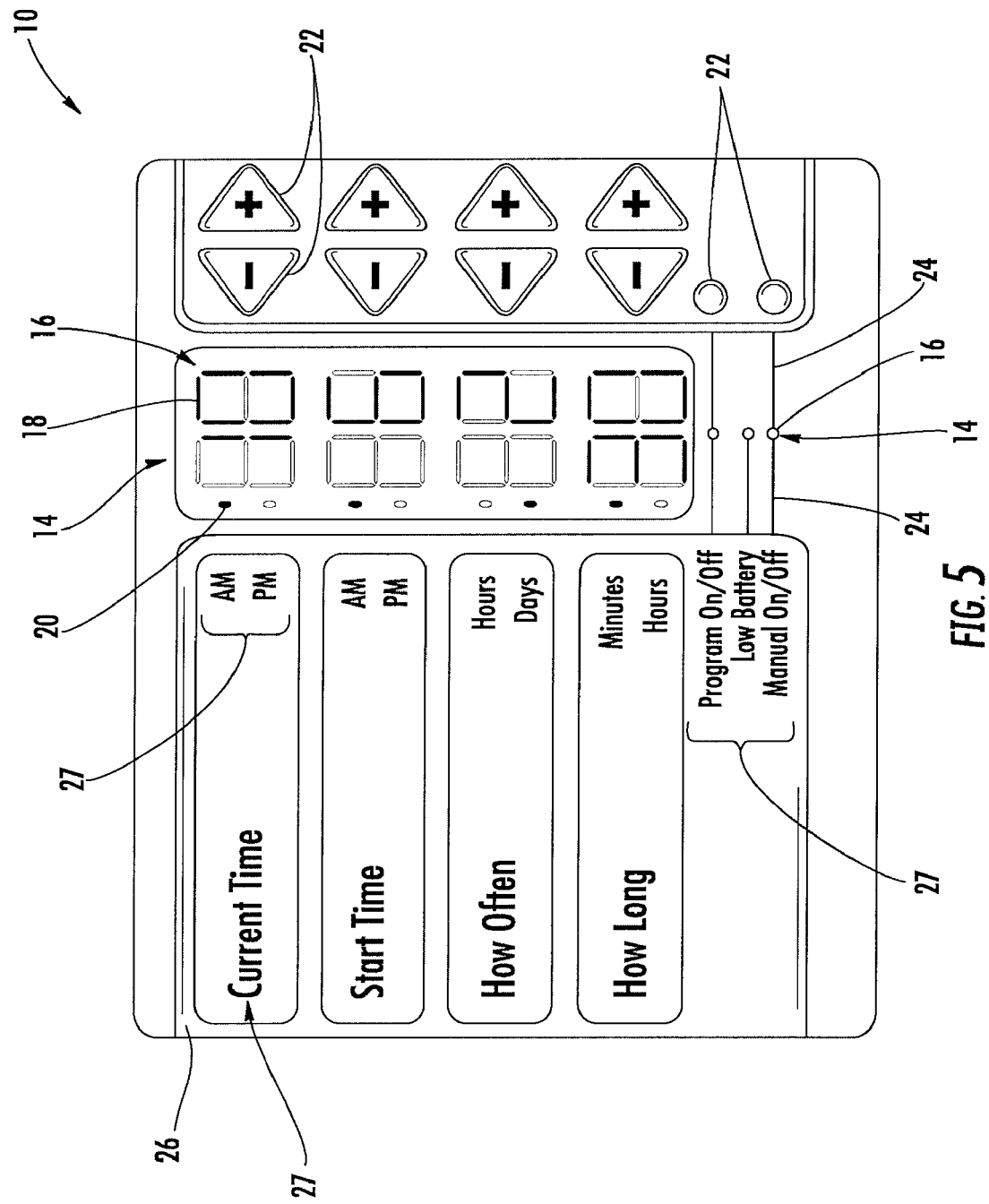
FIG. 5 is a side elevation view of a programmable device with a removably attached template according to aspects of the invention, showing markings to associate a programming parameter with a programming descriptor and/or a user input.

As noted above, aspects of the invention seek to accommodate consumers who prefer a language other than the main language in the particular market, which can be achieved by providing a template 26 with programming descriptors 27 written in a desired language to the consumer. There are a number of ways in which the templates 26 can be provided. In one embodiment, a single template 26 can be packaged with the programmable device 10. Referring to FIGS. 4A and 4B, the template 26 can have a first side 32 and a second side 34. On the first side 32, the template 26 can include one or more programming descriptors 27 that are written in a first language. The second side 34 of the template 26 can include one or more programming descriptors 27 written in a second language, which is different from the first language. Thus, the consumer can select either the first language or the second language. The consumer can then attach the template 26 to the programmable device 10 such that the selected one of the programming descriptors 27 in the selected language substantially align with the user input 22 and/or the programming parameter 16.

The manufacturer of the programmable device 10 can determine the first and second languages in any suitable manner. For instance, the first and second languages can be based on the demographics of the market in which the device is sold. In the case of the south Florida market, one side of the templates can be printed in English, and the other side of the template can be printed in Spanish because of the large Hispanic population in that region of the country.

Figure 3:
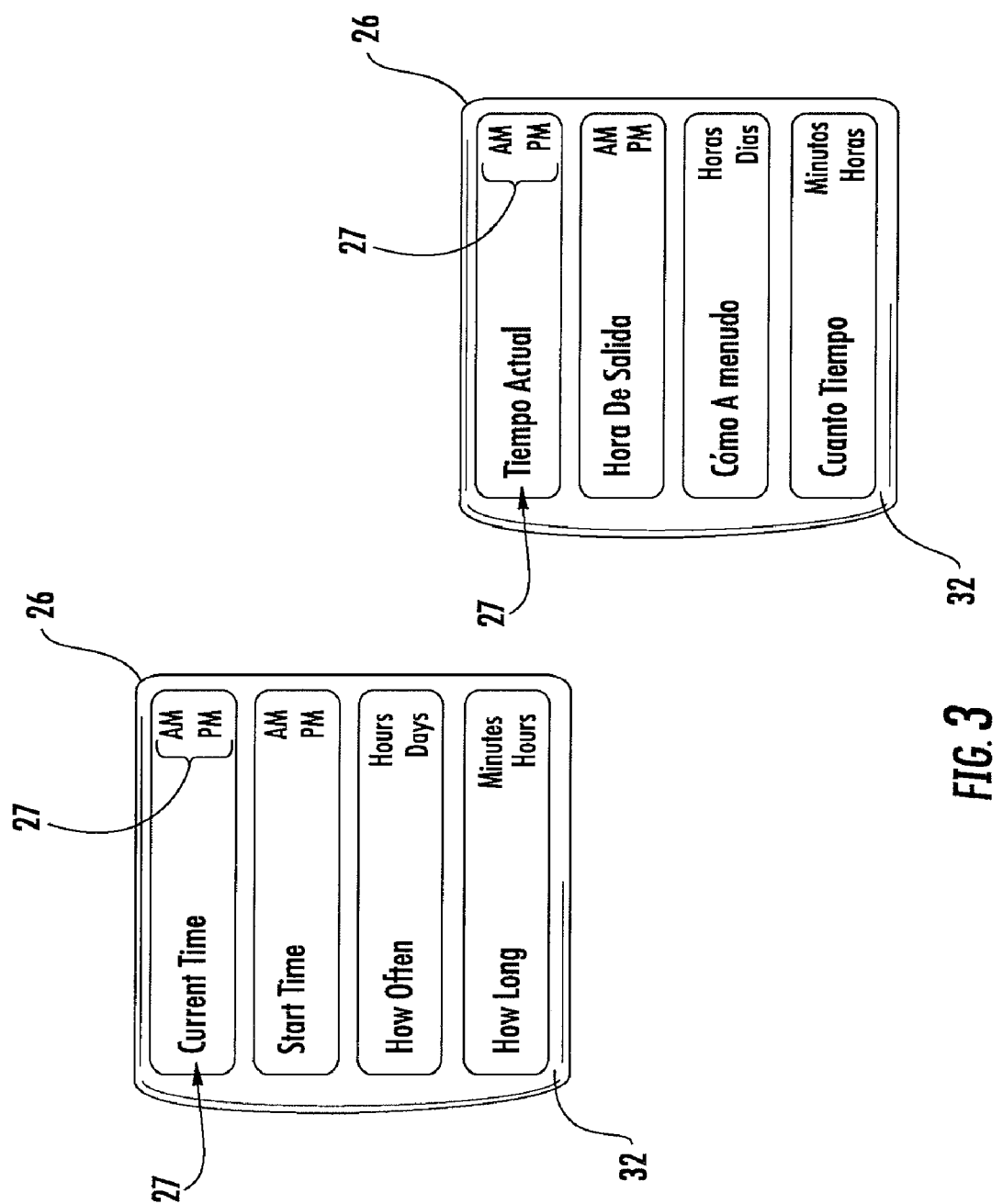
FIG. 3 is a side elevation view of a plurality of templates according to aspects of the invention, wherein each template includes programming descriptors written in a language that is different from the language used for the programming descriptors on the other templates.

In another embodiment, a plurality of templates 26, 26a can be provided with the programmable device 10, as shown in FIG. 3. For instance, when a consumer purchases a programmable device 10, a plurality of templates 26, 26a can be packaged with the device 10. Each of the templates 26, 26a can include one or more programming descriptors 27 written in a language that is different from the language used on the rest of the templates. The programming descriptors 27 can be provided on only one side of the templates 26, 26a. In one embodiment, the templates 26, 26a can include programming descriptors 27 on both sides of the templates 26, 26a, as previously described. Such double-sided templates can help to reduce the overall number of templates packaged with the device 10.

Figure 6:
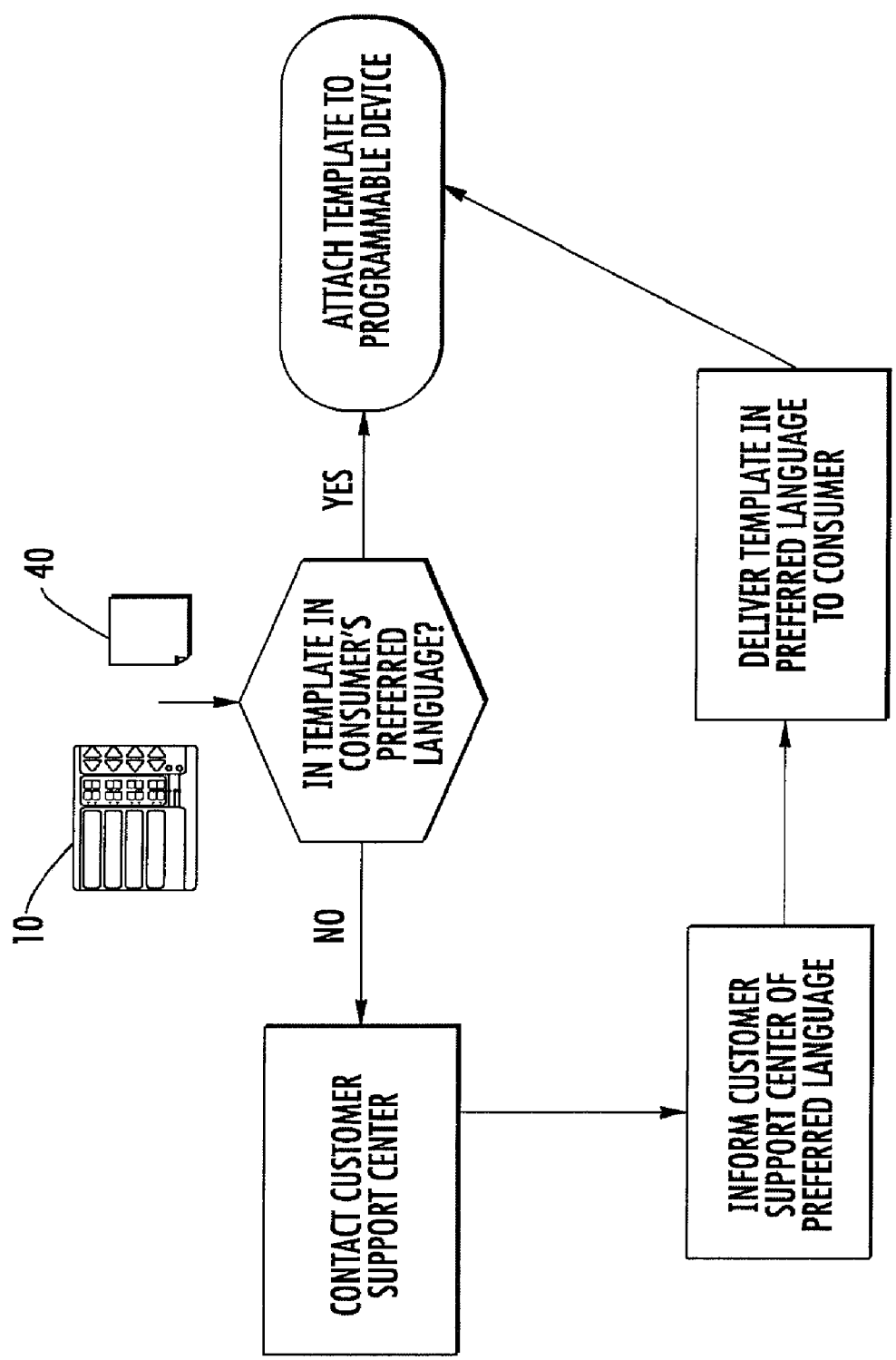
FIG. 6 is a flow chart showing a method by which a consumer can obtain a template with programming descriptors written in a preferred language.

Alternatively or in addition to the above, the programming device 10 can include instructions 40 directing a consumer to a customer support center where a template 26 in the preferred language can be ordered (FIG. 6). For instance, the instructions 40 can provide a telephone number so that the consumer can telephonically contact the customer support center, which can be automated or can include a live operator. Alternatively, the instructions 40 can provide a web site address so that the consumer can contact the customer support center by the internet to order a template 26 in the desired language. The web site can prompt the user to select a preferred language, among other things.

After the consumer places an order, a template 26 including programming descriptors 27 written in the desired language can be delivered to the consumer. In one embodiment, the template 26 can be mailed to the consumer. Alternatively, an electronic image of the template 26 can be downloaded by or otherwise sent to the consumer. For instance, the electronic image can be sent to the consumer by email in the form of an electronic file, such as in PDF format. The user can print the electronic image of the template onto a piece of paper or other media and attach the printed template to the programmable device 10 in any of the above described manners.

By configuring a programmable device 10 with removable templates 26, as described above, it will be appreciated that the consumer market for the programmable device 10 need not be limited because of diverse languages spoken or otherwise preferred within the market. Further, by providing consumers with programming information in a preferred language, it is more likely that the device 10 will be used correctly, thereby boosting consumer satisfaction with the product and the related brand.

The foregoing description is provided in the context of various systems and methods for facilitating user interaction with a programmable device in accordance with aspects of the invention. It will of course be understood that the invention is not limited to the specific details described herein, which are given by way of example only, and that various modifications and alterations are possible within the scope of the invention as defined in the following claims.

What is claimed is:

1. A programmable device comprising:
a programmable device having a display and a user input, wherein a programming parameter is presented on the display, the user input being substantially aligned with the programming parameter;
a template having a first side and a second side, the first side of the template including a programming descriptor, the template being removably attached to the programmable device such that the programming descriptor substantially aligns with at least one of the user input and the programming parameter, wherein the programming descriptor is written in a first language; wherein the second side of the template includes a programming descriptor written in a second language, wherein the second language is different from the first language.

2. The programmable device of claim 1 wherein the programmable device is a timer.

3. The programmable device of claim 2 wherein the timer is a sprinkler timer.

4. The programmable device of claim 1 wherein the programmable device is a thermostat.

5. The programmable device of claim 1 wherein the programming parameter is a numeral.

6. The programmable device of claim 1 wherein the programming parameter is a symbol.

7. The programmable device of claim 1 wherein the programmable device includes a pair of channels, wherein a portion of the template is received in each of the channels such that the template retainably engages the programming device.

8. The programmable device of claim 1 wherein the template is removably attached to the programmable device by one of tape, an adhesive or a fastener.

9. A method of improving user interaction with a programmable device comprising:
providing a programmable device having a display and a user input, wherein a programming parameter is presented on the display and wherein the user input is substantially aligned with the programming parameter;
providing a single template having a first side and a second side, the first side of the template including a first programming descriptor written in a first language, the second side of the template including a second programming descriptor written in a second language, the first language being different from the second language;

selecting one of the first and second languages; and attaching the template to the programmable device such that the selected one of the first and second programming descriptors substantially aligns with at least one of the user input and the programming parameter.

10. The method of claim 9 wherein the programmable device is a timer.

11. The method of claim 10 wherein the timer is a sprinkler timer.

12. The method of claim 9 wherein the programmable device is a thermostat.

* * * * *